May 5, 1936.  A. R. WILLIAMS  2,039,863
METHOD OF AND APPARATUS FOR EVALUATING ELECTRICAL SERVICE
Filed March 22, 1935
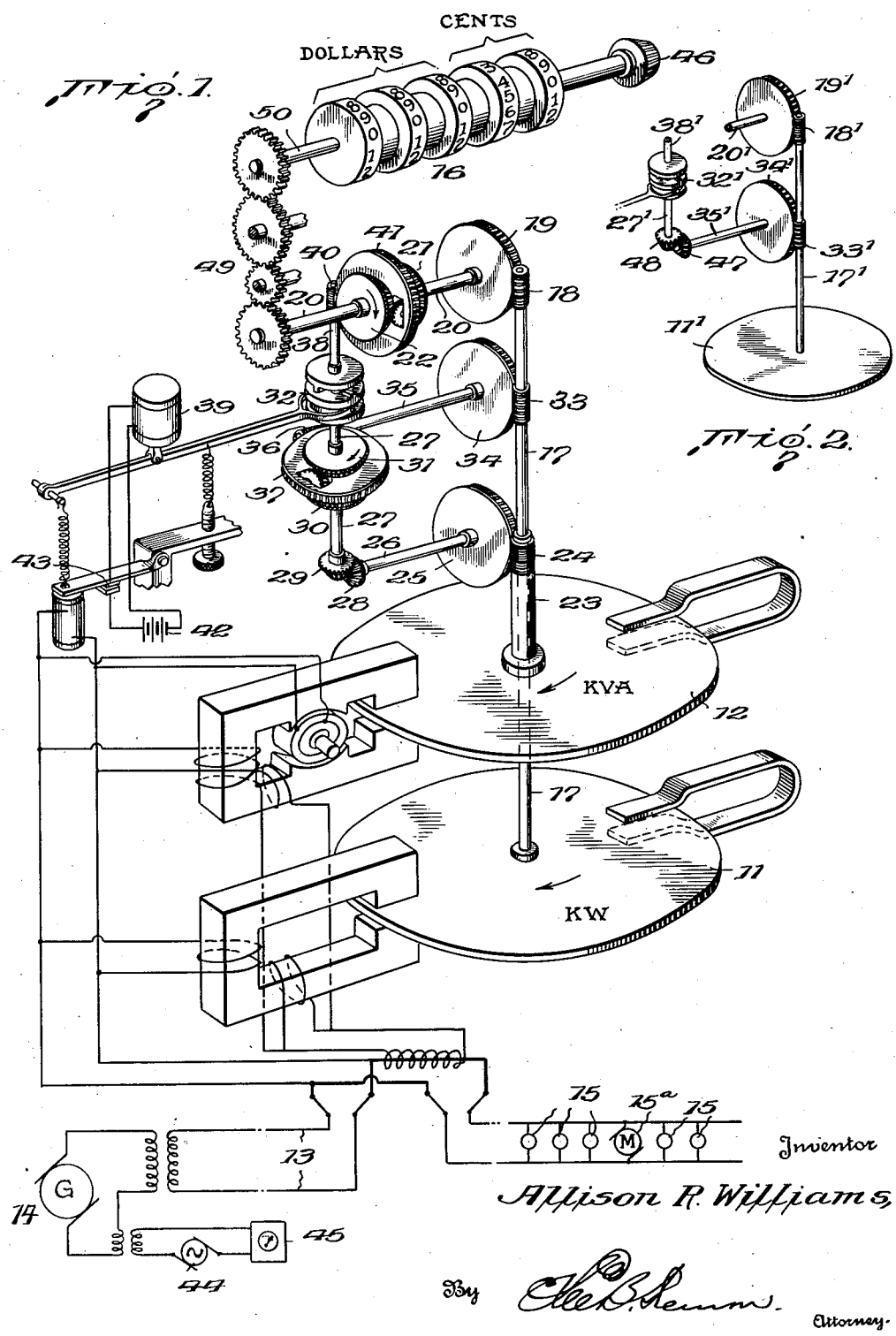

Patented May 5, 1936

2,039,863

UNITED STATES PATENT OFFICE 2,039,863

METHOD OF AND APPARATUS FOR EVALUATING ELECTRICAL SERVICE

Allison R. Williams, Yazoo City, Miss.

Application March 22, 1935, Serial No. 12,510

23 Claims. (Cl. 171—34)

This invention relates to a method and a mechanism or instrument for accurately determining the value of electrical service rendered by a power company to a consumer.

At the present time, there are in actual use a large number of different methods, systems, and instrumentalities for measuring electricity used, and for determining a charge therefor against the user. The great majority of the present electrical service evaluating systems are found, after careful consideration, to be generally unfair to the consumer because such systems fail to charge each consumer with the fair value of the service he has received, as based upon the actual burden he has placed on the power company. The present widespread application of numerous and varying arbitrary rates has resulted in placing unjust burdens on the consumer and in some instances on the seller. It is also the fact, that many of the present systems are discriminatory in favoring certain classes of consumers at the expense of other classes.

It is therefore the prime object of this invention to provide a method and apparatus for fairly determining the actual value of electrical service rendered.

It is the object of this invention to provide a method and apparatus of the character described that is applicable to all classes of electrical energy consumers.

It is the further object of this invention to provide an instrument which will accurately measure the electrical energy used by a consumer, together with other electrical characteristics of the load, and compute the charge for said energy, based on the actual burden placed on the seller by the use of that particular energy.

Other objects and advantages of the invention will become apparent from the following detailed description of principles underlying the operation of a practical embodiment hereinafter explained.

The actual money charge which a consumer of electrical energy should pay for same is solely dependent on that portion of seller's expenditures which were necessarily incurred by the seller in furnishing that particular energy. The expenditures made by an electrical power company are logically and naturally divided into three groups. Group I is designated capacity charges and includes interest on company indebtedness, ad-valorem taxes, insurance premiums, depreciation or sinking fund allotments and the like. All of the capacity charges are directly proportional to the size of the power producing plant. Group II which may be designated energy charges, includes the fuel costs, if any, the cost of energy transmission and distribution, the cost of operating labor and superintendence, maintenance costs including labor and material, transmission and distribution losses, taxes levied on the basis of gross sales, etc. All of the energy charges are directly proportional to the number of units of electrical energy produced and sold. Group III is designated customer charges and includes metering and billing expenses, complaint adjustment expense, and administrative expenses including general office expense. All of the customer charges are directly proportional to the total number of consumers to which the seller furnishes electrical service.

From an equitable standpoint, the consumer's responsibility for the Group I or "capacity charges" should be proportional to that consumer's demand on the seller when the total demand of all consumers on the system is a maximum, provided some adjustment is made for the difference between the consumer's particular load factor and the system load factor. It will be noted that if all of the demands of all consumers being served are taken at the time of maximum demand on the system each day and the average automatically taken for the billing period, this will automatically take care of the diversity between consumers and between classes of consumers, and also the daily diversity between the demands of any system consumer at time of system peak. Thus, it will be possible to properly proportion each consumer's share of the total fixed charges on the facilities that he uses.

Where a particular consumer's load is drawn at unity power factor it is readily apparent that this Group I charge may be based entirely upon actual power, or kilowatts, used during the period of maximum system load. If, however, the consumer's power factor is less than unity, allowance therefor must be made. The capacity or fixed charges on investment in the mechanical end of the power plant and system, that is, land, boilers, dams, turbines, pumps, etc., being proportional to the actual power demands, will be proportional to and based upon the measured kilowatt demand at system peak, and any consumer's share of the fixed charges on this part of the seller's investment that that particular consumer shares in using along with other consumers will be determined by the ratio of his kilowatt demand measured at system peak to total system peak kilowatt demand. On the other hand, the capacity or fixed charges on the investment in electrical equipment and facilities such as generators, transformers, distribution wire or cables, switches, etc., are proportional to the apparent electrical peak demand, that is, kilovolt-ampere demand measured during time of system peak, and any consumer's share of these fixed charges will be measured by the ratio of his kilovolt-ampere demand measured at time of system peak to the total kilovolt-ampere demand of system peak.

In general, therefore, the Group I, or capacity charges may be represented by (1) $XI_m(\text{kw.}) + XI_e(\text{kva.})$ where X equals the rate of fixed charges, $I_m$ and $I_e$ the investments per unit of capacity in the mechanical and electrical ends of the power system respectively, and (kw.) and (kva.) the consumer's demands measured in kilowatts and kilovolt-amperes, respectively, while the entire system load is a maximum. It may be noted that X may be the rate of fixed charges per day, per week, per month, or per hour, or for any other period of time during which the separate consumer demands are measured at maximum demands of the system. For instance, as an illustration of the flexibility of this method, it might be that a system load had during the twenty-four hours two distinct and approximately equal peaks. It would be logical with a bi-modal load curve of this type to have all loads measured at the time of each peak, and have X equal the rate of fixed charges for twelve hours so as to distribute the total fixed charges required on investments in electrical and mechanical equipment and facilities equally on the consumers making up the morning peak, we will say, and those making up the evening peak. It will also be noted that each of these factors, that is, kilowatts and kilovolt-amperes, is measured by allowing in the one case, a kilowatt hour meter to register for an hour, and, in the other, a kilovolt-ampere hour element to operate for an hour. But if the character of the system load curve is such that at the peak or peaks it is very flat maintaining its maximum for, say, two hours, then it will only be necessary to use for X a value half that of the true rate of fixed charges so that we would have the integrated kilowatt hours under the demand curve divided by the time which would give us in effect the mean average of the demand during the two hour period multiplied by the rate of fixed charges X. Likewise, of course, with the kva. hour element.

Coming now to the Group II, or "energy charges", it will be seen that they should be proportioned to the actual energy used, with adjustment in the energy unit cost, if any, an account of the load factor of the individual consumer. This group of charges may be equitably expressed by the empirical expression (2) $Y_1(\text{kwh.}) + Y_2(\text{kwh.})\dfrac{1}{CLF}$ where kwh. equals the total energy consumed, measured in kilowatt hours, CLF is the consumer's load factor, and $Y_1$ and $Y_2$ are constants so selected that the total energy charge is equal to the total plant energy cost of producing a kilowatt hour when the consumer's load factor is average. Since the consumer's load factor, CLF, equals the number of kilowatt hours the consumer has actually used in any given period, divided by the consumer's demand in kilowatts times the number of hours in that same period, the second expression in the above formula may be converted as follows:

(3) $Y_2(\text{kwh.})\dfrac{1}{CLF} = Y_2(\text{kwh.})\dfrac{1}{\frac{(\text{kwh.})}{H_p(\text{kw.})}} = Y_2 H_p(\text{kw.})$ In this formula the characters represent the same quantities as before, $H_p$ representing hours in the period, be it month or day, for which the consumer's load factor is determined.

Finally, the consumer's responsibility for the Group III, or "customer charges", should be the same for each consumer in any particular class of consumers, and is hence equal to the total customer charges for a class divided by the number of consumers in that class. The letter Z may be used to represent this group of charges, where Z is a fixed sum per month, or other billing period, and is determined by dividing the total "customer charges" for the billing period by the number of consumers served.

Adding together the above three groups of charges the following is obtained as an expression of the total value, V, of the electric service delivered to the consumer.

(4) $V = XI_m(\text{kw.}) + XI_e(\text{kva.}) + Y_1(\text{kwh.}) + Y_2 H_p(\text{kw.}) + Z$ or to express it slightly differently:

(5) $V = (XI_m Y_2 H_p)(\text{kw.}) + XI_e(\text{kva.}) + Y_1(\text{kwh.}) + Z$

In the empirical Formula (2) above the energy charge $Y_1$ is always taken equal to one-half the average system unit energy cost adjusted for losses, $Y_s$, and $Y_2$ is equal to $$\dfrac{Y_s(SLF)}{2}$$

where (SLF) is the system load factor. Hence, in order to determine the value of constants $Y_1$ and $Y_2$, it is only necessary to know the system load factor and the average system delivered unit energy cost. For illustration, assume that (SLF) equals .5 and $Y_s$ equals $0.006, then $Y_1$ equals $0.003 and $Y_2$ equals $0.003 (SLF). Hence, in this case, if (CLF) also equals .5, then $$Y_2 \dfrac{1}{CLF}$$

equals $0.003 and $Y_1 + Y_2$ equals $0.006 or the same consumer unit cost as system unit cost. Or again, assuming system average unit cost equals $0.006 and (SLF) equals .6, then $Y_2$ equals $0.003 (.6) or $0.0018. Hence, if (CLF) equals .3 then $Y_1 + Y_2$ equals $$\$0.003 \times \dfrac{.0018}{.3} \text{ or } \$0.009$$

On the other hand, if (SLF) equals .6 but (CLF) equals .9 then $Y_1 + Y_2$ equals $$\$0.003 \times \dfrac{0.0018}{.9} \text{ or } \$0.005$$

The above illustrates the effect that the meter would have in automatically adjusting the unit energy cost charged for different consumer load factors.

Since $(XI_m + Y_2 H_p)$, $XI_e$, $Y_1$ and Z of Equation (5) are all constants, we may simplify the expression by stating that (6) $V = C_1(\text{kw.}) + C_2(\text{kva.}) + C_3(\text{kwh.}) + C_4$ In this formula of electric service evaluation, there are only three variables, kilowatt demand (kw.), kilovolt-ampere demand (kva.) and total energy (kwh.). Each of the other factors is a constant for a given consumer class and given power company. Therefore, in order to determine the actual value to be charged a given consumer for his use of electrical energy, it is sufficient to provide an electrical measuring instrument which measures that consumer's demands (kw.) and (kva.) in kilowatts and kilovolt-amperes, respectively, when the system load is maximum, and his energy consumption (kwh.) in kilowatt hours. Such an instrument is shown diagrammatically in the annexed drawing illustrating a preferred embodiment of the invention.

Referring now to the drawing, Fig. 1 illustrates diagrammatically, in perspective, an embodiment of the present invention in the form of an instrument, shown for simplicity, as arranged for a single phase two wire alternating current power supply. The invention is obviously adaptable to other types of power supply such as direct current, and polyphase alternating current systems having three or more wires. Fig. 2 illustrates a somewhat modified form of the invention.

In Fig. 1 the reference numeral 11 designates an integrating element for measuring kilowatt hours and 12 is a second integrating element for measuring kilovolt-ampere hours. These two meter elements may be constructed along conventional lines and are electrically connected to the power lines 13 in the usual manner. A simple power generating plant is indicated generally by the numeral 14 and the consumer's load is indicated by a bank of lamps 15 and a motor 15a.

Included in the two element instrument is a set of indicating dials 16 arranged to indicate in dollars and cents the consumer's charge for electrical service used since the prior reading and billing. The two meter elements 11 and 12 are connected to the indicating mechanism 16 by mechanical connections which will now be described.

The shaft 17 of the kilowatt-hour element 11 is provided with a worm 18 engaging the worm wheel 19 on shaft 20. The shaft 20 has two differential gears 21 and 22 interposed between the worm wheel 19 and the indicating mechanism 16. The kilovolt-ampere hour element 12 is shown mounted on hollow shaft 23 carried by shaft 17, but free to turn thereon. Shaft 23 is provided with a worm 24 which engages the worm wheel 25 on shaft 26. This shaft 26 drives shaft 27 through bevel gears 28 and 29. Shaft 27 has two differential gears 30 and 31 interposed between worm wheel 25 and a clutch 32.

The shaft 17 is also provided with a worm 33 which engages the worm wheel 34 on shaft 35. Shaft 35, in turn, is provided with a worm 36 engaging worm wheel 37 arranged as the ring gear for differential gears 30 and 31, whereby shaft 35 may drive shaft 27. The shaft 27 is connected to the shaft 38 through the clutch 32 operated by a solenoid 39. The shaft 38 is provided with a worm 40 engaging the worm wheel 41 which serves as the ring gear for differential gears 21 and 22. The solenoid 39 is connected in series with a suitable energy supply 42, and a relay operated switch 43. The relay switch 43 is responsive to currents of definite frequency which may be superimposed on the regular power lines 13 as by a frequency generator 44 located at the power station and operated at definite times, as for example, by a time clock 45. The indicating mechanism 16 is provided with resetting mechanism (not shown), and operated by the knob 46. Shaft 50 of the indicating mechanism 16 is connected, as by gear train 49, to be driven by shaft 20.

In operation, the above described instrument functions as follows: The kilowatt hour meter 11 operates continuously while the consumer is using electrical energy and measures the kilowatt hours energy consumed (kwh.). The rotation of the meter shaft 17 is transmitted to the indicating mechanism 16 through the worm 18, shaft 20, and differential 21, and 22. The worm 18 and worm wheel 19 have such pitch that the dollars and cents dials of the indicating mechanism are operated at a speed proportional to the kilowatt hours (kwh.) energy used. The speed ratio is thus equal to the constant $C_3$ of Formula (6).

The kilovolt-ampere hour meter 12 operates continuously but is connected to the worm 40, worm wheel 41 and the indicating mechanism 16 only periodically, for example, once every twenty-four hours when the clutch 32 is engaged. Since the consumer's kilovolt-ampere demand (kva.) is to be charged for only when the system load is at a maximum, the clutch 32 is engaged by remote control from the power station through the definite frequency responsive relay switch 43. For example, the clutch 32 may be thus engaged for a period of one hour during the period when the system load is maximum. The number of kilovolt-ampere hours measured for one hour is the consumer's (kva.) demand, since kva. demand is equal to the number of kva. hours per hour. The pitch of the worms 24 and 40 and worm wheels 25 and 41 are selected so that the ratio between the number of kva. and the indicating dials 16 is equal to the constant $C_2$ of Formula (6). Thus the second term of the formula for the total charge is added by the summation action of the differential gear 21, 22, and 41 of the $C_3$ (kwh.) measured by meter 11.

Since the meter 11 measures kwh., the consumer's kw. demand is measured by the operation of the meter 11 for a period of one hour. This value is communicated to the indicating mechanism 16 through the magnetically operated clutch 32, the operation of which has already been described. The pitch of the worms 33, 36, and 40 and worm wheels 34, 37 and 41 is such that the ratio between the kw. demand and the indicating mechanism is equal to the constant $C_1$ of Formula (6). Thus the charge indicated by the first term of the formula for the total charge is added by the summation action of the differential gear 30, 31, and 37 to the charge for the second term measured by the kva. hour meter 12, and the charge for the third term measured by the kwh. meter 11.

The fourth term, $C_4$, of Formula (6) is a constant amount per consumer per month and may be conveniently added to the other three terms by an adjustment of the initial setting of the indicating device 16 each time it is reset, i. e., when the registering drums are cleared for the next measuring period the initial or zero calibration is made to automatically register the $C_4$ or customer charge, for that ensuing billing period. Where the billing period is one month, the indicating mechanism 16 is read by the power company meter reader who may then by means of the knob 46 reset the indicating dials back to the amount of $C_4$, the Group III "customer charge", for the following month. As the consumer then uses electrical service during the month, the proper charges are added to the indicating dials as the energy is used. The consumer can tell by a glance at the indicating dials at any time exactly what he owes the power company at that time for service since the last billing.

A meter embodying this invention and as illustrated in Fig. 1 permits, as explained, the proportioning of the "capacity charges" between the consumer's kw. and kva. demands. Where the consumer's load is used at substantially unity power factor, however, it will, of course, as has been already explained, be possible to determine the entire "capacity charge" from the kw. demand and the meter thereby simplified. In Fig. 2 this modification is illustrated. Here reference numeral 11' designates the integrating element for measuring kilowatt hours, mounted on meter shaft 17'. Shaft 17' is provided with a worm 18' engaging wormwheel 19' on shaft 20'. Also mounted on shaft 17' is a worm 33' engaging wormwheel 34' on shaft 35'. The latter shaft is connected to shaft 27' by bevel gears 47 and 48 and shaft 27' is connected to shaft 38' through a clutch 32'. Primed reference numerals are used to designate elements in Fig. 2 corresponding to those already described in Fig. 1.

From the above description of Fig. 2 the operation of this modification of the present invention is readily apparent. The second term of Formula (6) is thus omitted, the entire "capacity charge" being measured by (kw.) demand by the proper selection of constant $C_1$. The capacity charge $C_1$ (kw.) is, therefore, registered by the gear train beginning with worm 33', worm wheel 34', etc., to which is added the "energy charge" $C_3$ (kwh.) through the gear train beginning with worm 18', worm wheel 19', etc. As before, the "customer charge" $C_4$ is added by the proper initial setting of the indicating mechanism 16.

It will be apparent that the described arrangement will permit of variations in the method of metering. For example, it is possible to effect a variation in the kw. and kva. demand rates by operating the relay switch 43 for different lengths of time. Furthermore, by the provision of individual clutches and operating circuits for the kw. and kva. elements it is obvious that it would be possible to vary these demand rates independently of each other.

It will also be apparent that indicating means other than that shown might be used. For example, instead of a visual indicating means, any printing device well known in the art might be used wherein copies of the amount of the bill might be made before the resetting of the instrument. Such a printing device, for instance, as that disclosed in the patent to Pierson, #1,229,514, granted June 12, 1917, might be employed. One copy of this bill could then be left by the meterman with the consumer, one copy placed in the meterman's book, and the third forwarded to the bookkeeper of the power company. By the practice of this invention the cost of computing the amount of the bill at the central offices of the power company and subsequently forwarding the bill to the individual consumer can be eliminated.

Furthermore, the described method of metering permits of the making at the power plant of a permanent record of the operation of the rate changing equipment whereby the proper government or other agencies may supervise and control these activities.

Other modifications and mechanical embodiments may be made within the scope of the present invention, all of which form a part thereof to the extent that they may be within the scope and meaning of the appended claims.

What I claim as my invention is:

1. In a method of evaluating electrical service to a consumer, the steps comprising measuring the electrical energy actually supplied to the consumer, and periodically during selected periods of time adding to such measurement of energy a factor proportional to that consumer's demand during such periods.

2. In a method of evaluating electrical service to a consumer, the steps comprising measuring the electrical energy actually supplied to the consumer, and periodically during selected periods of time adding to such measurement of energy a factor proportional to that consumer's kilowatt demand during such periods.

3. In a method of evaluating electrical service to a consumer, the steps comprising measuring the electrical energy actually supplied to the consumer, and periodically during selected periods of time adding to such measurement of energy a factor proportional to the consumer's kilovolt-ampere demand during such periods.

4. In a method of evaluating electrical service to a consumer, the steps comprising measuring the electrical energy actually supplied to the consumer, and periodically during selected periods of time adding to such measurement of energy other measured quantities, one of which is proportional to the consumer's kilowatt demand during such periods and another of which is proportional to the consumer's kilovolt-ampere demand during such periods.

5. In a method of measuring electrical service to a consumer, the steps comprising measuring the kilowatt hours actually supplied, and adding to such measurement other quantities, one of which is proportional to the consumer's electrical demand during selected periods of time, and another of which is a constant quantity equal to a pro-rated customer charge 6. In a method of measuring electrical service to a consumer, the steps comprising measuring the kilowatt hours actually supplied, and adding to such measurement other quantities, one of which is proportional to the consumer's kilowatt demand during selected periods of time, and another of which is a constant quantity equal to a pro-rated customer charge.

7. In a method of measuring electrical service to a consumer, the steps comprising measuring the kilowatt hours actually supplied, and adding to such measurement other factors, one of which is proportional to the consumer's kilovolt-ampere demand during selected periods of time, and another of which is a constant equal to a pro-rated customer charge.

8. In a method of evaluating electrical service to a consumer, the steps comprising measuring the electrical energy actually supplied to the consumer during a billing period, periodically, during selected periods of excessive system load within said billing period, adding to such measurement of energy other quantities including one which is a function of the consumer's kilovolt-ampere demand measured during said selected periods, another which is a function of the consumer's kilowatt demand measured during said selected periods, and a third which is a constant equal to a pro-rated customer charge for the billing period.

9. In apparatus for evaluating electrical service, the combination comprising, means for measuring actual energy consumed, means for measuring electrical demand, means for rendering effective said second-mentioned means during selected intervals, and means for adding during such selected intervals to the measurement of actual energy consumed a quantity which is proportional to the measurement of electrical demand.

10. In apparatus for evaluating electrical service, the combination comprising, means for measuring actual energy consumed, means for measuring actual energy demand, means for rendering effective said second-mentioned means during selected intervals, and means for adding during such selected intervals to the measurement of actual energy consumed a quantity which is proportional to the measurement of the actual energy demand.

11. In apparatus for evaluating electrical service, the combination comprising, means for measuring actual energy consumed, means for measuring apparent energy demand, means for rendering effective said second-mentioned means during selected intervals, and means for adding during such selected intervals to the measurement of actual energy consumed a quantity which is a function of the apparent energy demand.

12. In apparatus for evaluating electrical service, the combination comprising, means for measuring actual energy consumed, means for measuring actual energy demand, means for measuring apparent energy demand, means for rendering effective said last two mentioned means during selected intervals, and means for adding during such selected intervals to the measurement of actual energy consumed factors proportional to the measurements of actual and apparent energy demands.

13. In apparatus for evaluating electrical service, the combination comprising a kwh. meter, a kvah. meter, a registering mechanism, means connecting each of said meters to said mechanism for operating the same at a rate proportional to the individual meter rates and to their combined rates, and means for automatically controlling the time and duration of the connection of said kvah. meter to said mechanism.

14. In apparatus for evaluating electrical service, the combination comprising a kwh. meter, a registering mechanism, means connecting said meter to said mechanism at all times for operating the same at a rate proportional to the total energy to be metered and a second means for connecting said meter to said mechanism during selected periods of time for operating the same to add to the metering of total energy a factor proportional to the actual energy demand during such periods.

15. In apparatus for evaluating electrical service, the combination comprising a kwh. meter, a kvah. meter, a registering mechanism, means connecting said kwh. meter to said mechanism at all times for operating the same at a rate proportional to the total energy to be metered, and means for connecting each of said meters to said mechanism during selected periods of time for operating the same to add to the metering of total energy a factor proportional to actual energy and apparent energy demands during such periods.

16. In apparatus for evaluating electrical service, the combination comprising a kwh. meter, a registering mechanism, means connecting said meter to said mechanism at all times for operating the same at a rate proportional to the total kwh. to be metered, a second means for connecting said meter to said mechanism, said last-named means including means operable to render effective said second connecting means during periods corresponding to excessive system load, whereby a quantity proportional to kw. demand is added to the registered measure of kwh. made by said meter.

17. The method of evaluating electrical service to a consumer, which comprises measuring the electrical energy actually supplied to the consumer, and periodically during selected periods adding to such measurement a quantity which is a function of the consumer's demand during the selected period.

18. In an electric metering device, means for measuring the electrical energy consumed; electrical demand controlled means for varying the effect of said measuring means; and means for rendering said varying means effective over predetermined load periods.

19. In an electrical metering device, means for measuring the electrical energy consumed; and electrical demand controlled means for varying the effect of said first named means over predetermined load periods.

20. In an electrical metering system of the type employing a single registering means for totalizing a plurality of varying electrical quantities, that method which consists in continuously registering the actual energy consumed and during predetermined selected periods adding to such measurement another factor which is a function of the electrical demand over the selected periods.

21. In an electrical metering system of the type employing a single registering means for totalizing a plurality of varying electrical quantities, that method which consists in continuously registering the actual energy consumed and during predetermined peak load periods adding to such measurement another quantity which is a function of the actual electrical demand over the selected periods.

22. In an electrical metering system of the type employing a single registering means for totalizing a plurality of varying electrical quantities, that method which consists in continuously registering the actual energy consumed and during predetermined periods adding to such measurement other quantities which are functions of the actual and apparent electrical demands over the predetermined periods.

23. In an electric metering device, means for measuring the electrical energy consumed; electrical demand controlled means for varying the effect of said measuring means; and time controlled means for rendering said demand controlled means effective during predetermined periods.

ALLISON R. WILLIAMS.